(12) United States Patent
Nordquist

(10) Patent No.: US 6,536,754 B2
(45) Date of Patent: Mar. 25, 2003

(54) LEVELLING APPARATUS

(75) Inventor: Hakon Nordquist, Täby (SE)

(73) Assignee: System 3R International AB, Vallingby (SE)

( * ) Notice: Subject to any disclaimer, the term of this patent is extended or adjusted under 35 U.S.C. 154(b) by 0 days.

(21) Appl. No.: 09/878,354

(22) Filed: Jun. 12, 2001

(65) Prior Publication Data
US 2001/0050457 A1 Dec. 13, 2001

(30) Foreign Application Priority Data
Jun. 13, 2000 (DE) .......................... 100 28 393

(51) Int. Cl.[7] ................................. B23Q 3/18
(52) U.S. Cl. ...................................... 269/60
(58) Field of Search .................. 269/60, 71, 56, 269/95, 73, 289 R, 254 CS; 108/20, 137, 143

(56) References Cited

U.S. PATENT DOCUMENTS

| 2,862,410 A | * | 12/1958 | Meyer | 269/60 |
|---|---|---|---|---|
| 3,578,799 A | * | 5/1971 | Davis | 269/289 R |
| 4,013,280 A | * | 3/1977 | Chitayat et al. | 269/60 |
| 4,409,860 A | * | 10/1983 | Moriyama et al. | 269/60 |
| 4,855,558 A | | 8/1989 | Ramsbro | |
| 4,925,168 A | | 5/1990 | Ramsbro | |
| 5,301,933 A | * | 4/1994 | Inoue | 269/73 |
| 5,769,561 A | | 6/1998 | Pettersson | |
| 6,338,477 B1 | * | 1/2002 | Moore | 269/60 |

FOREIGN PATENT DOCUMENTS

| EP | 0 196 544 | 10/1986 |
|---|---|---|
| EP | 0 255 042 | 2/1988 |

* cited by examiner

Primary Examiner—Lee Wilson
(74) Attorney, Agent, or Firm—Jacobson Holman PLLC

(57) ABSTRACT

A levelling apparatus which comprises a lower part and an upper part which is mounted to the lower part and which may be adjusted with respect to the lower part. The lower part is provided with reference elements for its definite positioning, and the upper part is provided with mechanisms for mounting a workpieceholder for a workpiece which is to be worked on by a machine tool especially a wire erosion machine. For ensuring an improved positioning of the workpiece relative to the erosion wire at elevated pressures of the rinsing fluid, the lower side of the upper part has a first beam structure and the upper side of the lower part has a second beam structure which is complementary to the first beam structure such that the beams of the first beam structure extend between the beams of the second beam structure.

20 Claims, 5 Drawing Sheets

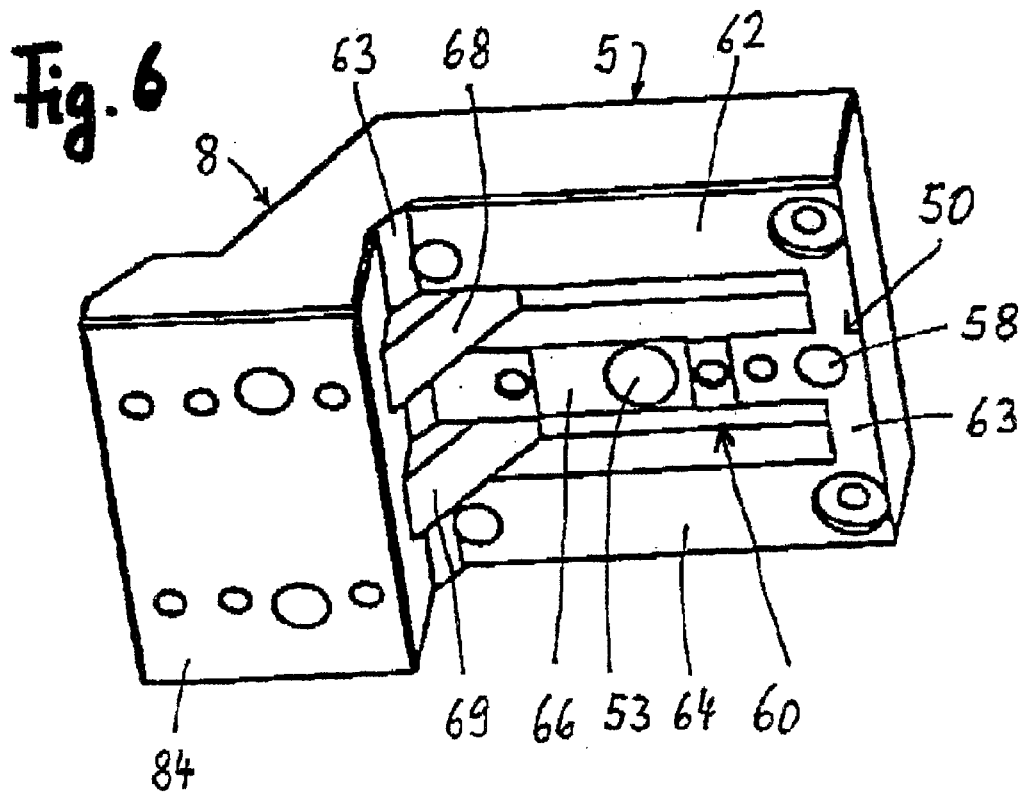
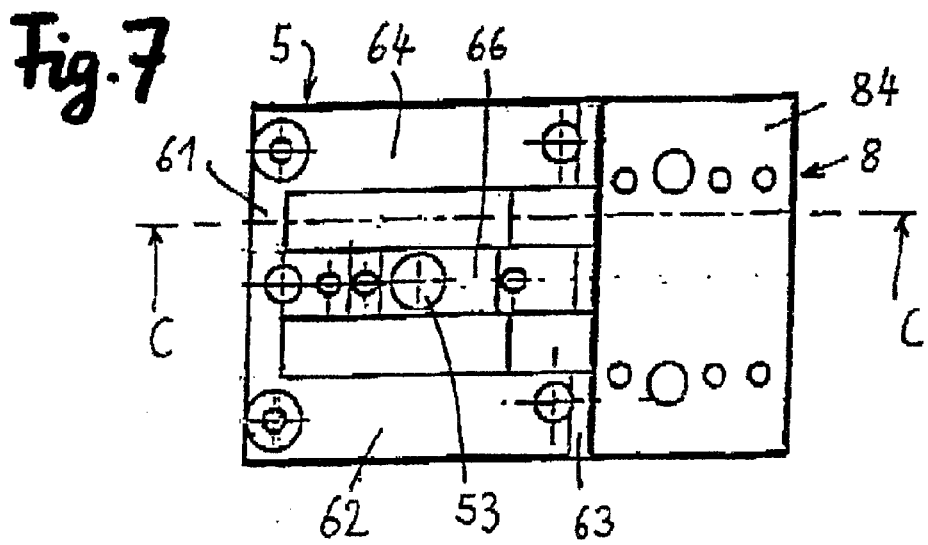
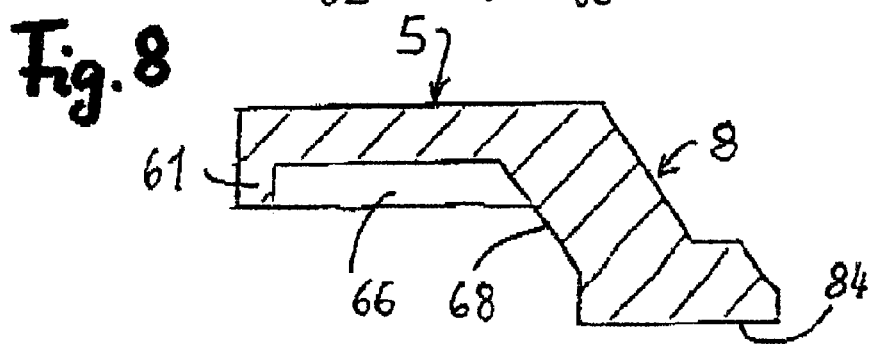

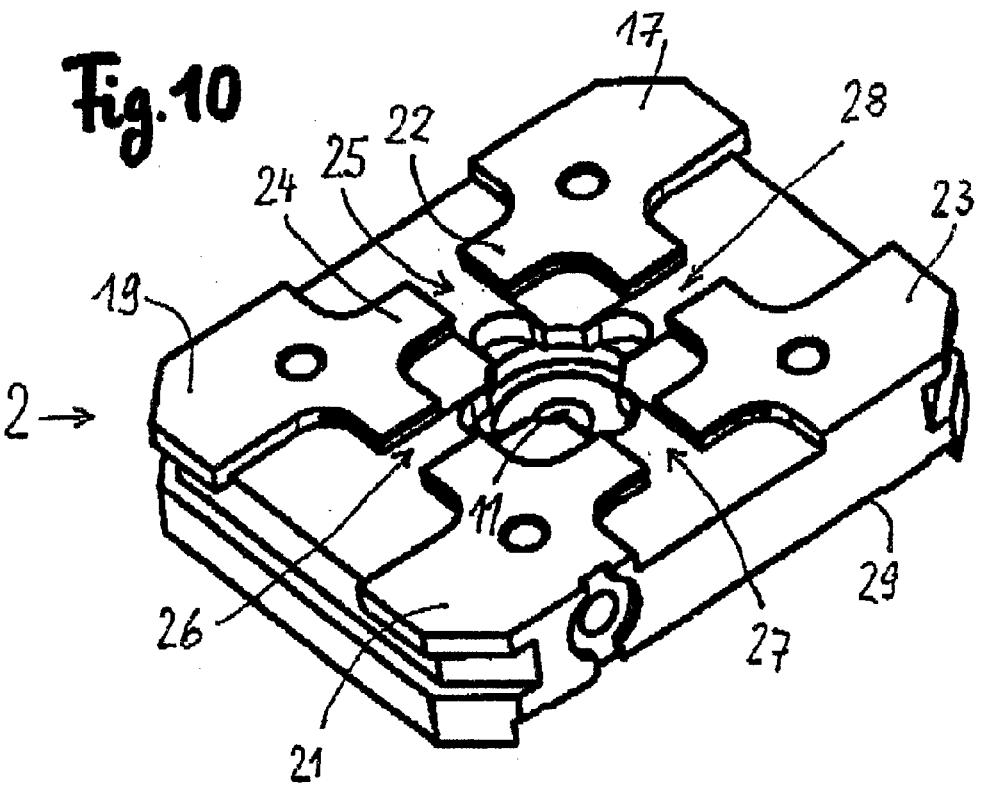
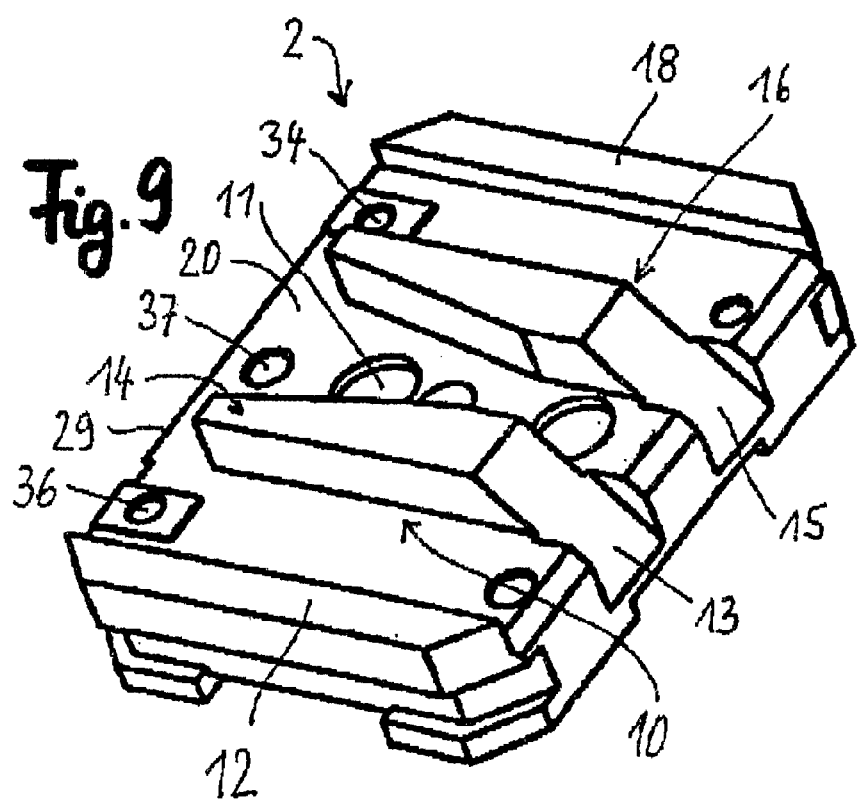

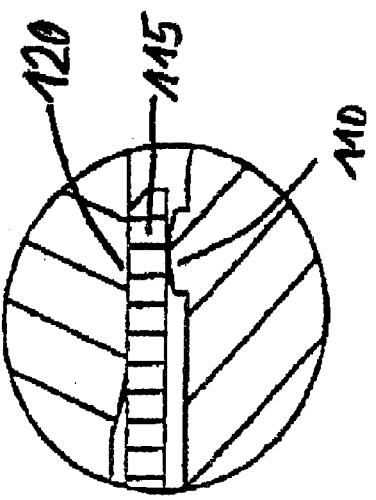
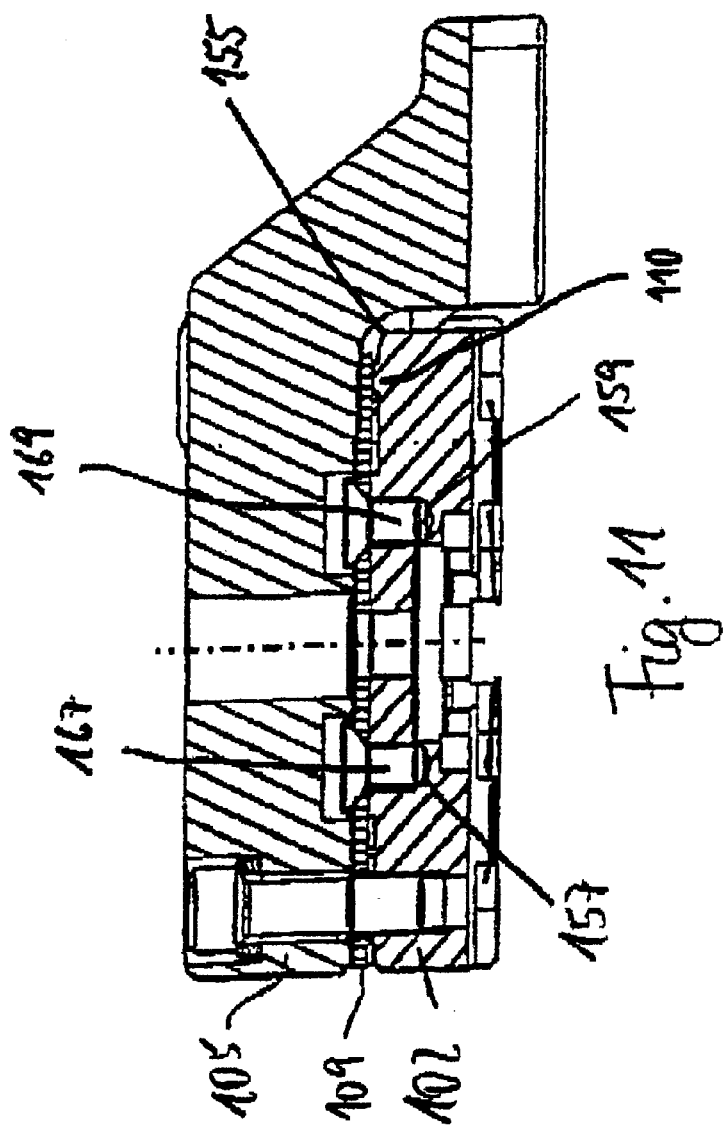

LEVELLING APPARATUS

BACKGROUND OF THE INVENTION (1) Field of the Invention

The invention relates to a levelling apparatus having a lower part and an upper part which is mounted to the lower part and which is adapted to be adjusted relative to the lower part. The lower part has reference elements for its definite positioning. The upper parts equipped with means for mounting a workpieceholder for a workpiece to be operated upon by a machine tool especially a wire erosion machine.

(2) Description of Related Art

Such a levelling apparatus is disclosed in the document U.S. Pat. No. 5,769,561. The workpieceholder is mainly a vise which is adapted to hold a workpiece to be cut by an erosion wire. An example of such a vise is disclosed in EP-B-196,544 (=U.S. Pat. No. 4,925,168).

Modern wire cut erosion machines cut more precisely and more efficiently than older machines of such type. This improvement is achieved by a higher electric current flow and an improved control of the current flow and an improved removal of waste by an elevated pressure of the rinsing fluid. The nozzle through which the rinsing fluid emerges under high pressure, is positioned in most of said machines in close proximity to the workpiece to be worked upon. The pressure of the rinsing fluid is not constant but varies in short intervals of time. Such variations do not impair the rapid removal of waste but have an impact on the definite position of the workpiece. The workpiece is induced to vibrate and vibrations of the workpiece caused thereby can hardly be suppressed by the known levelling device. Thus, the workpiece suffers from deviations from its definite position and an accurate cutting of the workpiece can hardly be achieved.

BRIEF SUMMARY OF THE INVENTION

It is therefore an object of the invention to devise an improved levelling apparatus which ensures rigidity and sturdiness of the workpiece positioning close to the cutting wire even if the pressure of the rinsing fluid varies.

To this end the invention provides for a levelling apparatus which has a lower part and an upper part mounted to the lower part and adapted to be adjusted with respect to the lower part, wherein the lower part is provided with reference elements for its definite positioning, and wherein the upper part is provided with means for mounting a workpieceholder for a workpiece which is to be worked on by a machine tool especially a wire erosion machine, and wherein the lower side of the upper part has a first beam structure and the upper side of the lower part has a second beam structure which is complementary to the first beam structure such that the beams of the first beam structure extend between the beams of the second beam structure. The invention allows a substantial improvement of the rigidity and sturdiness of the levelling apparatus without the necessity to enhance the thickness of the upper part and of the lower part. If the thickness of the upper part and of the lower part would be augmented it would no longer be possible to position the workpiece very close to the exit of the cutting wire of a wire erosion machine in view of the restricted space left free for the workpiece. On the other hand it is mandatory to place the workpiece as close to the cutting wire exit as possible for obtaining high precision cuts.

According to a preferred embodiment of the invention the beams of the first beam structure and the beams of the second beam structure are parallel and straight. Preferably, the beams of the first beam structure are directed towards the means for mounting the workpieceholder. The rigidity is further improved if according to an embodiment of the invention the height of each beam of the first beam structure measures at least one third of the width of such beam. It is also advantageous with respect to rigidity if at least some of the beams of the first beam structure are connected by transverse beams. Thereby a type of a beam lattice work is obtained.

Furthermore, the means for mounting the workpieceholder may include an extension form from a front edge of the upper part wherein the extension may be connected to the lower side of the upper part by reinforcing bars. Such reinforcing bars may extend into spaces between beams of the first beam structure. Moreover, the reinforcing bars may be inclined downwardly and forwardly in view of an improvement according to which the extension extends downwardly towards a lateral side of the lower part, specifically if the upper part is mounted on the top of the lower part.

According to an additional improvement of the invention a space is formed between neighboring beams of the first beam structure, the space having a width which is substantially equal to the width of one of the laterally adjacent beams. The second beam structure may comprise two opposite lateral beams extending outside and adjacent to the upper part and, preferably, transversely to a front edge of the upper part. It is useful to make the lateral beams run parallel to each other. In adaption to the inclination of the reinforcing bars the second beam structure may comprise intermediate beams each having a front ramp.

The exact positioning of the workpiece clamped to the workpieceholder is made easier if according to another prefered improvement of the invention a first adjustment screw is arranged with great distance to the front edge of the upper part for an up or down adjustment of the upper part relative to the lower part, an axis about which the upper part may be adjusted running closely and parallel to said front edge. Specifically, said axis may be defined by an imaginary connecting line drawn through a bolt which is surrounded by a spring assembly producing a bias on the upper part and the lower part, and through a second adjustment screw for a tilting adjustment of the upper part relative to the lower part. Structurally, the axis may be formed by a first rib which extends parallel to said front edge and projects out of the upper side of the lower part or out of the lower side of the upper part. Moreover, a second rib may be provided which extends transversely to the front edge and projects out of the lower side of the upper part or out of the upper side of the lower part, for tilting the upper part relative to the lower part to the right or to the left. A composite adjusting movement of the upper part therefore will take place about a pivot point which is situated in the crossing of both ribs.

Last not least a specifically preferred embodiment of the invention resides in the provision of a leaf spring of T form which extends between the upper part and the lower part and is mounted either to the upper part or to the lower part, a transverse leg of the leaf spring being spaced to the front edge and being fastened to the upper part or to the lower part, and a longitudinal leg of the leaf spring being directed to the front edge and being fastened to a middle beam of the first beam structure or of the second beam structure. Moreover, the leaf spring has a front end which is close to the front edge and extends between the first rib and the second rib. Thus, the rib of the upper part will rest upon the front end and the front end will rest upon the rib of the lower part.

According to a further aspect of the invention free surfaces of the apparatus may be covered by vibrations damping material.

BRIEF DESCRIPTION OF THE DRAWINGS

Presently prefered embodiments of the invention are described hereinafter in detail with reference to the accompanying drawings of which show:

FIG. 6 a perspective view from below of the upper part of the apparatus according to FIG. 1;

FIG. 7 a plan view of the upper part according to FIG. 6 from below;

FIG. 8 a vertical section through the upper part along the line C—C of FIG. 7;

FIG. 9 a perspective view from above of the lower part of the apparatus;

FIG. 10 a perspective view from below of the lower part of the apparatus;

FIG. 11 a vertical section through the apparatus similar to FIG. 4; and

FIG. 12 a detail out of FIG. 11 in an enlarged scale.

DETAILED DESCRIPTION OF THE INVENTION

Figure 1:
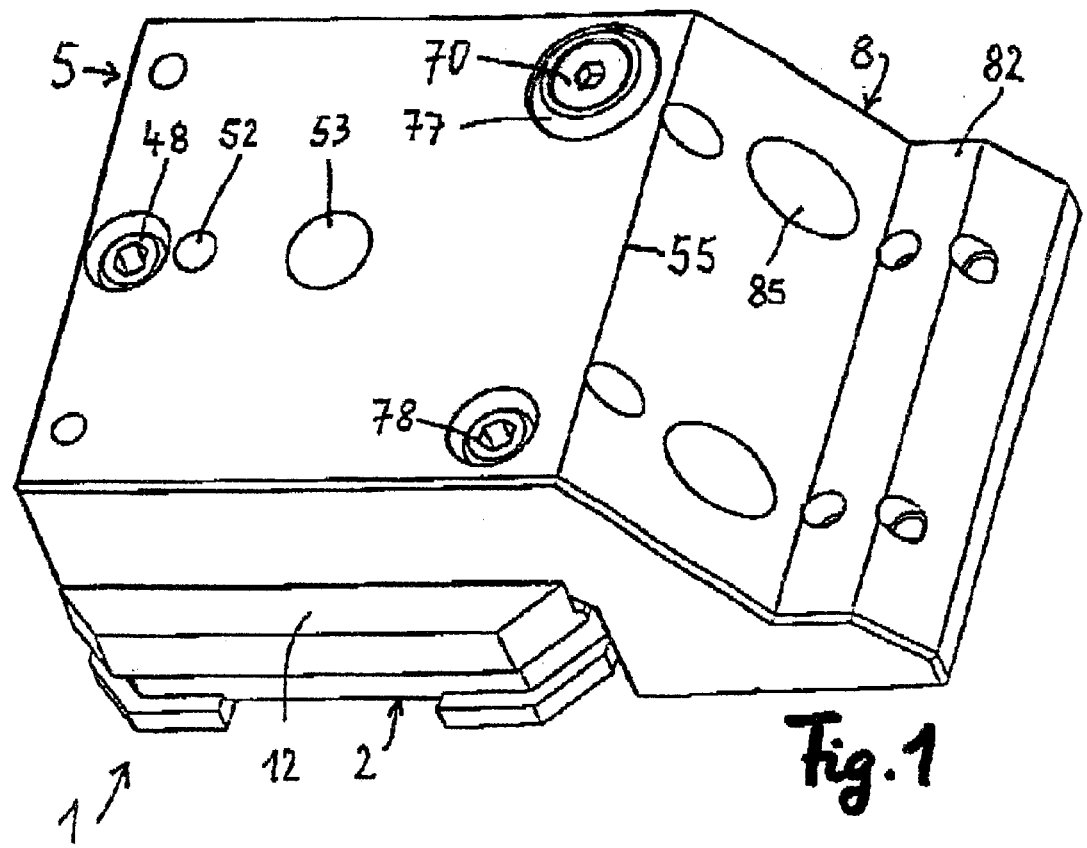
FIG. 1 a perspective view from above of a levelling apparatus.
Figure 4:
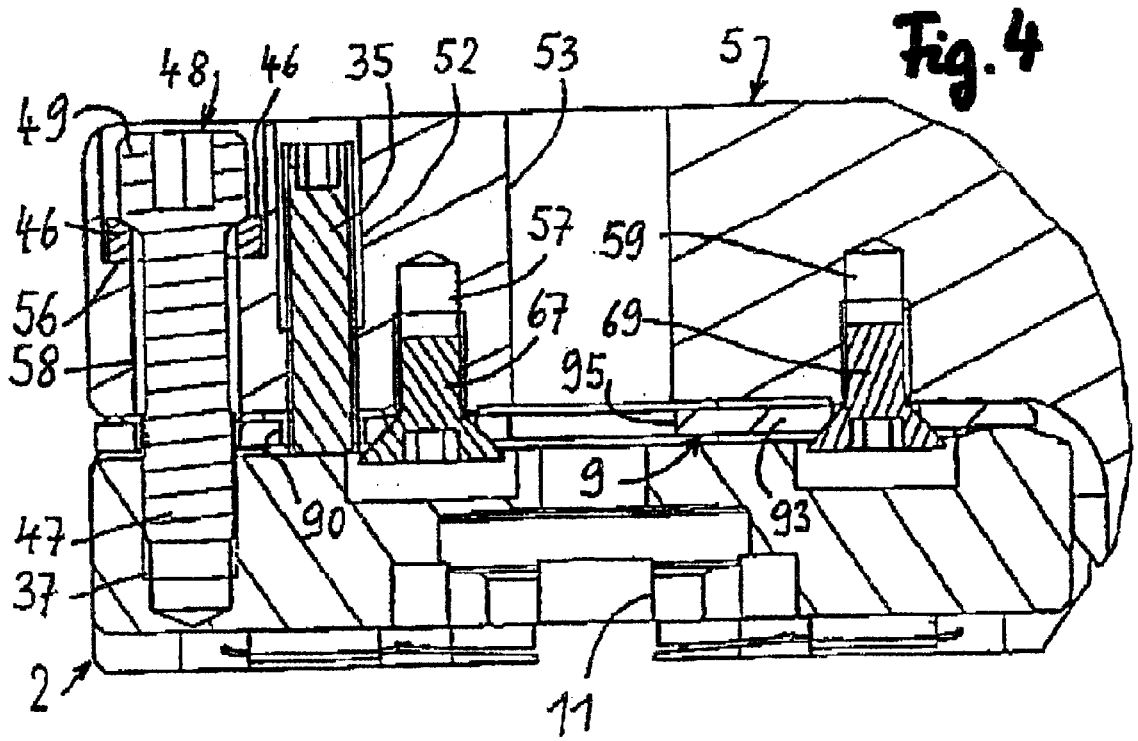
FIG. 4 a vertical section in enlarged scale through the apparatus according to FIG. 1 along the line B—B in FIG. 2, a portion of the apparatus being broken away.
Figure 5:
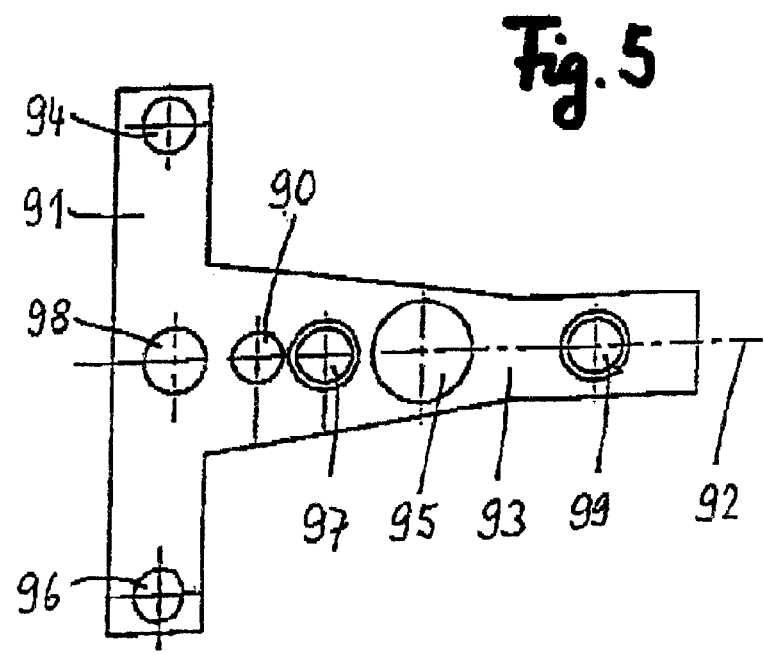
FIG. 5 a plan view of a leaf spring of the apparatus according to FIG. 1.

The levelling apparatus 1 comprises a lower part 2 and an upper part 5 screwed to the lower part 2, and a leaf spring 9 fitted between the lower part and the upper part as may be seen from FIGS. 1, 4 and 5. An extension 8 is formed from the front edge 55 of the upper part 5 being a one piece steel part. The extension 8 extends forwardly and next to the lower part 2 and has a surface 82 which is stepped forwardly and downwardly. The extension 8 is provided with two rows of through holes 85 which rows are spaced and parallel to the front edge 55. Thus, a workpieceholder like a vise disclosed in EP-B-196,544 may be fastened to the plane lower surface 84 of the extension 8.

The leaf spring has the form of a T having a transverse leg 91 and a middle longitudinal leg 93. The longitudinal leg 93 is broadened in its transition to the transverse leg 91 symmetrically to his longitudinal axis 92. Through holes 94, 96 are located symmetrically to the longitudinal axis 92 at the ends of the transverse leg 91. Not shown screws which engage threaded bores 34, 36 in the upper side 20 of the lower part 2 (FIG. 9), extend through the through holes 94, 96 and fix the transverse leg 91 of the leaf spring 9 to the lower part 2. Two further holes 97, 99 are provided on either sides of a big central hole 95 in the longitudinal leg 93 along the longitudinal axis 92. Screws 67, 69 engage threaded blind holes 57, 59 which extend from the lower side 50 into the upper part 5. The screws 67, 69 extend through the holes 97, 99 and fix the longitudinal leg 93 to the upper part 5.

Another hole 98 is situated in the middle of the transverse leg 91 upon the longitudinal axis 92. A first adjustment screw 48 extends through the hole 98 with some clearance. The outwardly threaded shank 47 of the first adjustment screw 48 engages a threaded blind hole 37 extending into the lower part 2 from the upper side 20 thereof. The upper part 5 has a through hole 58 for receiving the first adjustment screw 48, the through hole 58 having a radial ring, shoulder 56 which widens radially the through hole 58. A ring 46 from hard metal rests upon the ring shoulder 56 and forms a seat for the broadened head 49 of the adjustment screw 48.

A further hole 90 is provided in the transversal leg 93 between the holes 97, 98, a counter screw 35 extending through hole 90. The counter screw 35 engages an internal thread of a through bore 52 of the upper part 5 and abuts the upper side 20 of the lower part 2.

A bolt 70 is provided close to the front edge 55 of the upper part 5 in a distance to the longitudinal axis 92 and a second adjustment screw 78 is provided close to the front edge 55 in the same distance to the longitudinal axis 92 but opposite to the bolt 70 on the other side of the longitudinal axis 92, an imaginary line which is perpendicular to the axis 92, being drawn through the bolt 70 and the second adjustment screw 78. Similar to the first adjustment screw 48 a shank having an outer thread, of the second adjustment screw 78 extends through a through hole through the upper part 5 and engages a threaded blind hole in the lower part 2. The radially broadened head of the second adjustment screw 78 abuts a hard metal ring resting on an inner radial shoulder in the through hole.

A threaded shank 72 of bolt 70 engages similarly a threaded blind hole 42 in the lower part 2. A section which is close to the shank 72 extends with play through a through hole 54 in the upper part 5. The through hole 54 is radially broadened in the vicinity of the upper side such that a disk spring assembly 77 is received within the broadening. The head of bolt 70 rests in a broad ring collar 70 which covers the disk spring assembly. The section of the threaded shank 72 which extends through the hole 54 is surrounded by a metal sleeve. Thus, the disk spring assembly 75 is supported on one end by the sleeve and on the other end abuts the inner wall of the broadening of the hole 54. Thereby a bias is created acting on the upper part 5 relative to the lower part 2.

Therefore, the extension 8 may be adjusted vertically or downwardly relative to the lower part 2 by turning the first adjustment screw 48 and may be tilted to the left or to the right relative to the lower part 2 by turning the second adjustment screw 78.

The lower side of the lower part 2 is equipped with reference elements which may cooperate with counter reference elements provided on the end surface e.g. of a not shown chuck for a definite positioning of the lower part relative to an orthogonal x-y-z-system (or a polar coordinate system). An example of such cooperation of reference elements with counter reference elements may be found in the document EP-B-255,042 the disclosure of which is incorporated herein. Thus, the lowerside of the lower part 2 is provided with four crosswise arranged pairs 25, 26, 27, 28 of opposing axially elastic lips such as lips 22, 24 of pair 25. The lower surface of the lower part 2 has also four plane corner surface portions 17, 19, 21, 23 each of which serves as a reference element for a z direction. The chuck includes a clamping device for a not shown draw bar which may extend into a central hole 53 of the upper part 5 and through the opening 95 in the leaf spring 9 and through a central opening 11 in the lower part 2 and penetrates the clamping device.

As explained above the upper part 5 and the lower part 2 should have substantial rigidity and sturdiness. On the other hand, when using the levelling apparatus for holding a workpiece in the vicinity of a cutting wire only very restricted space is available. The desired rigidity and sturdiness is obtained by a strong first beam structure 60 on the lower side 50 of the upper part 5 and by a strong second beam structure 10 on the upper side 20 of the lower part 2 which is complementary to the first beam structure 60 such that after mounting the upper part 5 to the lower part 2 beams of the first beam structure 60 are situated between beams of the second beam structure 10.

For the illustrated embodiment it may be seen from FIG. 6 that the first beam structure 60 comprises two parallel lateral beams 62, 64 and a middle beam 66 which is parallel to the lateral beams 62, 64. The ends of said beams are connected by a rearward transverse beam 63 and by a front transverse beam 61. The height of each beam measures at least one third of the width of a beam. The lateral beams 62, 64 and the middle beam 66 extend transversely to the front edge 55 and are directed towards the extension 8. Two parallel reinforcing bars 68, 69 are provided for transmitting the rigidity and sturdiness of the upper part 5 obtained by the beam structure 60 to the extension 8. The reinforcing bars 68, 69 extend downwardly from the front end of the interspaces between the middle beam 66 and each of the lateral beams 62, 64 into the body of the extension 8 thereby forming an angle of approximately 45°.

Figure 2:
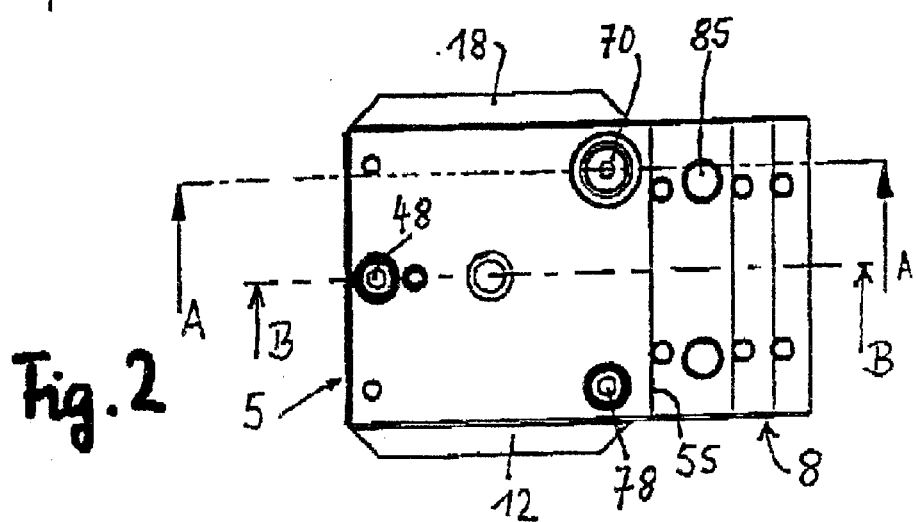
FIG. 2 a plan view of the apparatus according to FIG. 1.
Figure 3:
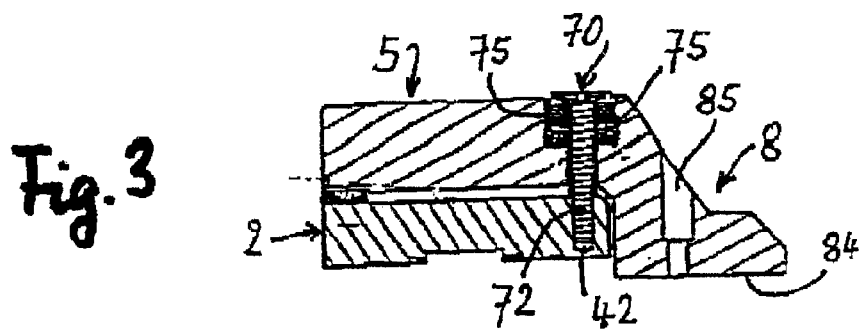
FIG. 3 a vertical section through the apparatus according to FIG. 1 along the line A—A in FIG. 2.

The second beam structure 10 of the lower part 2 comprises (FIG. 9) four parallel beams 12, 14, 16, 18 which project from the upper side 20 of the lower part 2. The opposing lateral beams 12, 18 extend next to the lower portion of the upper part 5, see FIGS. 1 and 2, and along the total length of the lower part 2. The intermediate beams 14, 16 extend from the front to the rear, each having a maximal width which is only a little smaller than the width of each of the interspaces between the lateral beams 62, 64 and the middle beam 66 of the upper part 5. Moreover, the maximal height of the intermediate beams 14, 16 above the upper side 20 of the lower part 2 is only a little smaller than the depth of said interspaces. Both intermediate beams 14, 16 have at the front thereof a ramp 13, 15 for preventing interference with the reinforcing bars 68, 69. Additionally, the intermediate beams 14, 16 taper to the rear and terminate at a position ahead a rearward edge 29 of the lower part 2 which allows mounting of the transverse leg 91 of the leaf spring 9 to the upper side of the lower part 2 as mentioned above, and a collision with the transverse beam 63 is avoided. The longitudinal leg 93 finds sufficient freedom between the intermediate beams 14, 16 and the tapers thereof.

Thus, if the upper part 5 is fastened to the lower part 2 as disclosed above the intermediate beams 14, 16 and the lateral beams 12, 18 fit like a comb between the beams 62, 64, 66, 61 of the upper part 5.

The embodiment of the invention according to FIGS. 11 and 12 is almost the same as the above explained embodiment. The levelling apparatus again comprises a lower part 102 and an upper part 105 and a leaf spring 109 interposed between upper part 105 and the lower part 102. A deviating feature may be seen in the blind holes 157, 159 each having an internal thread and each extending into the lower part 102. The blind holes 157, 159 are aligned to the holes 97, 99 in the leaf spring 109. Screws 167, 169 extend through the holes 97, 99 and engage the threads of the blind holes 157, 159, thereby fastening the leaf spring 109 to the lower part 102. However, the features which are essential for the invention are not influenced by the modified mounting of the leaf spring 109.

On the other hand, FIGS. 11 and 12 show more clearly the structure of the pivot point about which the upper part may be adjusted upwardly or downwardly by turning the first adjustment screw 48 and about which the upper part may be tilted to the left or to the right by turning the second adjustment screw 78. In the vicinity of the front edge 155 of the lower part 102 a first rib 110 having approximately a halfcylindric contour projects from the upper surface thereof which extends substantially parallel to the front edge 155. The end 115 of the leaf spring 109 which is proximate to the front edge 155 lies upon the first rib 110. A second rib 120 having also approximately a halfcylindric contour projects from the lower side of the upper part 105 opposite to the first rib 110 which extends substantially transverse to the front edge 155 and lies upon the end 115. The pivot point is therefore situated within the crossing area of both ribs 110 and 120, between which the end 115 of the lead spring 109 extends.

Of course it is within the scope of the invention to let project the first rib out of the lower side of the upper part an to let project the second rib out of the upper side of the lower part. It is important that the ribs are arranged crosswise irrespective of the particular mounting of the ribs.

What is claimed is:

1. A levelling apparatus comprising a lower part and an upper part, said upper part mounted to the lower part and pivotably adjustable with respect to the lower part, wherein said lower part is provided with reference elements for its definite positioning, and wherein said upper part is provided with means for mounting a holder for a workpiece which is to be worked on by a machine tool especially a wire erosion machine, and wherein, a lower side of the upper part has a first beam structure comprising a plurality of beams for reinforcing the upper part and, an upper side of the lower part has a second beam structure comprising a plurality of beams for reinforcing the lower part, said second beam structure complementary to the first beam structure such that beams of the first beam structure extend between beams of the second beam structure.

2. The apparatus according to claim 1 wherein the beams of the first beam structure and the beams of the second beam structure are parallel and straight.

3. The apparatus according to claim 2 wherein the beams of the first beam structure are directed towards the means for mounting the holder for a workpiece.

4. The apparatus according to claim 1 wherein the height of each beam of the first beam structure measures at least one third of the width of such beam.

5. The apparatus according to claim 1 wherein at least some of the beams of the first beam structure are connected by transverse beams.

6. The apparatus according to claim 1 wherein a space is formed between neighboring beams of the first beam structure, the space having a width which is substantially equal to the width of one of the laterally adjacent beams of the second beam structure.

7. The apparatus according to claim 1 wherein free surfaces are covered by vibration damping material.

8. A levelling apparatus comprising a lower part and an upper part, said upper part mounted to said lower part and adjustable with respect to said lower part, wherein said lower part is provided with reference elements for definite positioning, and wherein said upper part is provided with an extension formed from a front edge of the upper part for mounting a holder for a workpiece which is to be worked on by a machine tool, especially a wire erosion machine, the extension being connected to a lower side of the upper part by reinforcing bars, and wherein the lower side of the upper part has a first beam structure and, the upper side of the lower part has a second beam structure which is complementary to the first beam structure such that the beams of the first beam structure extend between the beams of the second beam structure.

9. The apparatus according to claim 8 wherein the reinforcing bars extend into spaces between beams of the first beam structure.

10. The apparatus according to claim 8 wherein the reinforcing bars are inclined downwardly and forwardly, and wherein the extension extends towards a lateral side of the lower part.

11. The apparatus according to claim 10 wherein the second beam structure comprises intermediate beams each having a front ramp which is adapted to the inclination of the reinforcing bars.

12. A levelling apparatus comprising a lower part and an upper part, said upper part mounted to said lower part and adjustable with respect to said lower part, wherein said lower part is provided with reference elements for definite positioning, and wherein said upper part is provided with means for mounting a holder for a workpiece which is to be worked on by a machine tool especially a wire erosion machine, and wherein the lower side of the upper part has a first beam structure and, the upper side of the lower part has a second beam structure which is complementary to the first beam structure such that the beams of the first beam structure extend between the beams of the second beam structure, wherein the second beam structure comprises two opposite lateral beams extending outside and adjacent to the upper part.

13. The apparatus according to claim 12 wherein the lateral beams extend transversely to a front edge of the upper part.

14. The apparatus according to claim 12 wherein the lateral beams run parallel to each other.

15. A levelling apparatus comprising a lower part and an upper part, said upper part mounted to said lower part and adjustable with respect to said lower part, wherein said lower part is provided with reference elements for definite positioning, and wherein said upper part is provided with means for mounting a holder for a workpiece which is to be worked on by a machine tool especially a wire erosion machine, and wherein the lower side of the upper part has a first beam structure and, the upper side of the lower part has a second beam structure which is complementary to the first beam structure such that the beams of the first beam structure extend between the beams of the second beam structure, and a first adjustment screw is arranged spaced a distance from a front edge of said upper part for an up or down adjustment of the upper part relative to the lower part, and wherein an axis about which said upper part may be adjusted runs closely to and parallel to said front edge.

16. The apparatus according to claim 15 wherein the axis for up or down adjustment is defined by an imaginary connecting line drawn through a bolt which includes a spring assembly producing a bias on the upper part and lower part, and through a second adjustment screw for a tilting adjustment of the upper part relative to the lower part.

17. The apparatus according to claim 15 wherein said axis is formed by a first rib which extends parallel to the front edge and projects out of at least one of the upper side of the lower part and the lower side of the upper part.

18. The apparatus according to claim 17 wherein a second rib is provided which extends transversely to the front edge and projects out of at least one of the lower side of the upper part and the upper side of the lower part, for tilting the upper part relative to the lower part to the right or to the left.

19. A levelling apparatus comprising a lower part and an upper part, said upper part mounted to said lower part and adjustable with respect to said lower part, wherein said lower part is provided with reference elements for definite positioning, and wherein said upper part is provided with means for mounting a holder for a workpiece which is to be worked on by a machine tool especially a wire erosion machine, and wherein the lower side of the upper part has a first beam structure and, the upper side of the lower part has a second beam structure which is complementary to the first beam structure such that the beams of the first beam structure extend between the beams of the second beam structure, and, a leaf spring of T form extends between the upper part and the lower part and is mounted to at least one of the upper part and the lower part, a transverse leg of the leaf spring being spaced to the front edge and being mounted to at least one of the upper part and lower part, and a longitudinal leg of the leaf spring being directed to the front edge and being mounted to a middle beam of at least one of the first and second beam structure.

20. The apparatus according to claim 19 wherein the leaf spring has an end which is close to the front edge and extends between the first rib and the second rib.

* * * * *